(No Model.)

E. HERRINGTON.
HORSE BREAKING VEHICLE.

No. 378,837. Patented Feb. 28, 1888.

Witnesses.
A. Ruppert,
Thomas P. Simpson.

Inventor.
Ephraim Herrington.
Per
Thomas P. Simpson,
Atty.

UNITED STATES PATENT OFFICE.

EPHRAIM HERRINGTON, OF MOUNT VERNON, GEORGIA.

HORSE-BREAKING VEHICLE.

SPECIFICATION forming part of Letters Patent No. 378,837, dated February 28, 1888.

Application filed September 19, 1887. Serial No. 250,096. (No model.)

*To all whom it may concern:*

Be it known that I, EPHRAIM HERRINGTON, of Mount Vernon, Montgomery county, Georgia, have invented an Improved Horse-Breaking Vehicle, of which the following is a specification.

The special object of the invention is to make a vehicle for breaking colts and wild horses, so that the operator cannot be injured or the vehicle seriously damaged.

Figure 1:
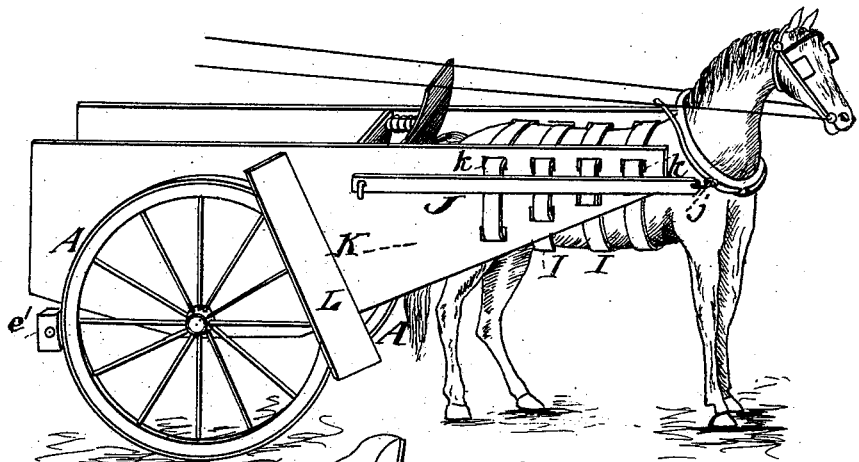
Figure 2:
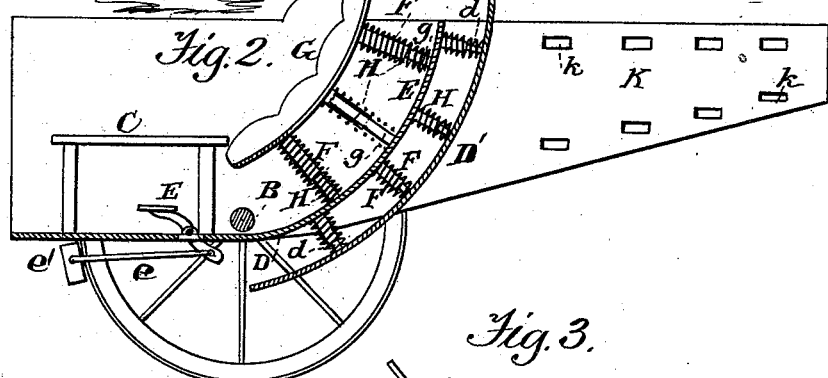
Figure 3:
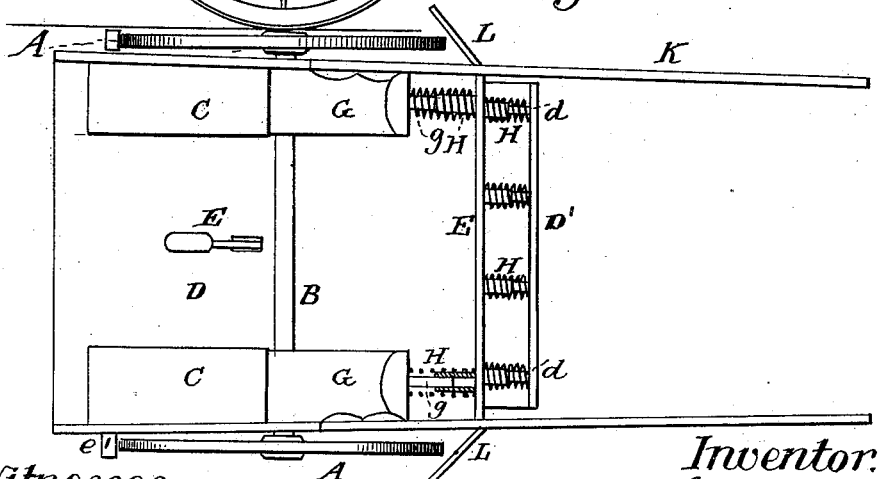

Figure 1 of the drawings is a perspective view; Fig. 2, a longitudinal vertical section; Fig. 3, a plan view.

In the drawings, A A represent the wheels; B, the axle; C, the seat; D, the bottom, curving up in front; and E, the treadle, connected by the rods $e\ e$ with the brake-shoes $e'\ e'$. The front D' is provided with the guide-pins $d$, tenoned at the end to play freely through the shield E, and connected with said shield by the spiral springs F, which encircle the pins.

G is a padded plate carrying in front the pins $g$, tenoned to work freely through the front D' and encircled by the spiral springs H. When the animal kicks, the spring-backed shield E takes the blow yieldingly and without injury to vehicle or horse, while if the operator is thrown forward against the cushioned and spring-held plate G no harm is done. The rear is open, so as to allow an easy outlet for the driver.

K K represent side-boards, which extend forward so as to form shafts for the horse, and have slots $k$, through which pass the bands I, which are buckled around the horse's body, while the traces J pass on the outside of the shafts and are secured on draft-hooks $j$. I thus confine the animal, so that he has little opportunity for lateral movements, while he cannot jump up before or behind without encountering the weight of the vehicle.

L L are protector-plates secured so as to incline backwardly over the wheels, and thus throw the vehicle laterally to one side as it is being carried against a tree or other obstacle.

Having thus described all that is necessary to a full understanding of my invention, what I claim as new, and desire to protect by Letters Patent, is—

1. In a horse-breaking vehicle, the shafts made broad or deep, provided with slots $k$, and made integral with the side-boards K, as and for the purpose set forth.

2. In a horse-breaking vehicle, the curved shield E, arranged in front of the body of vehicle and held forward by springs, as and for the purpose specified.

3. In a horse-breaking vehicle, the padded spring-supported plate G, arranged on the inside of the front D', as and for the purpose set forth.

4. In a horse-breaking vehicle, the protector-plates L L, arranged on a backward incline over the front of the wheels, as and for the purpose specified.

EPHRAIM HERRINGTON.

Witnesses:
THOMAS P. SIMPSON,
A. RUPPERT.